United States Patent
Cornyn, Jr. et al.

[11] 3,779,457
[45] Dec. 18, 1973

[54] DATA NORMALIZING METHOD AND SYSTEM

[75] Inventors: William S. Cornyn, Jr., Palos Verdes, Calif.; Stephen A. Dier, Fraser; Robert M. Lynas, Birmingham, both of Mich.

[73] Assignee: TRW Inc., Redondo Beach, Calif.

[22] Filed: June 28, 1971

[21] Appl. No.: 157,095

[52] U.S. Cl............ 235/151.3, 73/168, 235/151.1, 235/151.34, 324/71 R, 417/63
[51] Int. Cl. .......................... G06g 7/48, G06g 7/57
[58] Field of Search ................... 73/168, 3, 194 E; 235/151.1, 151.12, 151.13, 151.3, 151.34, 151.35, 151.3; 324/71 R, 71 SC, 71 SN, 73 AT; 417/63

[56] References Cited
UNITED STATES PATENTS

| | | | |
|---|---|---|---|
| 3,455,143 | 7/1969 | Shamp | 73/3 |
| 3,002,382 | 10/1961 | Gardner | 235/151.3 X |
| 3,299,258 | 1/1967 | Borsboom et al. | 235/151.34 |
| 3,566,685 | 3/1971 | Zimmerman et al. | 235/151.34 X |
| 3,614,892 | 10/1971 | Ottenstein | 235/151.34 X |

OTHER PUBLICATIONS

Pemberton, T. J. "How to Compensate for Valve—Process Mismatch." In Control Engineering. 16(9): p. 81–85. September, 1969.

*Primary Examiner*—Felix D. Gruber
*Assistant Examiner*—R. Stephen Dildine, Jr.
*Attorney*—Daniel T. Anderson et al.

[57] ABSTRACT

Raw numerical output data representing the value of a selected function or parameter which varies according to a known relationship with one or more control functions or parameters is monitored and its measured value is normalized to determined the value, i.e., normalized value of the date under preselected standard conditions at which the control parameters have predetermined standard or nominal values. Signals representing the values of the control parameters are produced and converted to correction factor signals representing the deviations, if any, between the monitored and standard values of the control parameters, and the correction factor signals are combined with a signal representing the measured value of the raw output data to obtain a normalized data signal representing the normalized value of the output data. The data normalizing operation may occur in a test mode which provides a readout representing the normalized data value, in a monitoring mode which provides a display representing the raw and normalized data values, the monitored control parameter values, and the parameter correction factor values or furnishes these values to a computer for further processing or to a data bank for storage, or in an adaptive mode which provides error or feedback signals for regulating the control parameters to maintain the latter precisely at or within a given range about their standard or nominal values.

18 Claims, 6 Drawing Figures

William S. Cornyn Jr.
Stephen A. Dier
Robert M. Lynas
*INVENTORS*

DATA NORMALIZING METHOD AND SYSTEM

BACKGROUND OF THE INVENTION

1. Field of the Invention

This invention relates generally to the field of data processing and more particularly to a novel data normalizing method and system for normalizing raw numerical output data to preselected standard conditions.

2. Prior Art

A variety of data gathering applications exist which involve monitoring raw numerical output data whose value varies with one or more control parameters and must be determined under predetermined standard conditions at which each control parameter has a predetermined value. One such application, for example, involves testing of rotary hydraulic steering pumps for automotive vehicles.

Hydraulic steering pumps are required to meet very rigid standards in order to insure their reliable operation in automotive vehicles. For this reason, such pumps are subjected to various qualification tests. One of these tests involves measurement of the pump flow rate. Since flow rate varies with certain control parameters, namely hydraulic fluid temperature, back pressure, and pump rotor speed, it is necessary to correlate the pump flow rate measurement with the control parameters in order to obtain the flow rate measurement at known parameter values.

At the present time, this correlation is accomplished by regulating the control parameters during the low rate measurement to maintain each control parameter constant at a predetermined standard test value. To this end, the existing steering pump qualification tests are performed with the aid of a test panel to which each pump is connected during test. This panel has means for operating the pump at the proper back pressure, fluid temperature, and rotor speed and measuring the flow rate at these standard test conditions.

While this method of testing steering pumps provides satisfactory test data, it has certain disadvantages which the present invention overcomes. Thus, the test procedure requires a precision test panel which is capable of precision regulation of the test control parameters, i.e., fluid temperature, pump back pressure, and pump rotor speed, to maintain these parameters at their standard test values with extremely close tolerances. As a consequence, the test panel is quite complex, costly, and requires frequent adjustment to maintain it in proper operating condition.

Many other data monitoring or gathering applications employ this same general technique of maintaining constant the control parameters which affect the output data being monitored. These other applications are thus subject to the same disadvantages as the described pump testing procedure.

SUMMARY OF THE INVENTION

The present data normalizing method and system avoid the disadvantages of the described data gathering technique. According to the invention, the raw numerical output data to be monitored and each control parameter on which the output data is dependent are monitored or sensed, and signals are produced representing the data and parameter values. Each control parameter signal is converted according to the relationship between the respective parameter and the output data being monitored into a correction factor signal representing the change in the value of the output data corresponding to the deviation, if any, between the monitored and standard or nominal values of the parameter. The several correction factor signals are combined with the raw output data signal representing the monitored value of the output data to obtain a resultant or normalized signal representing the value, i.e., normalized value, of the output data under standard conditions. As noted earlier, standard conditions are those at which the control parameters have their preselected standard values.

The present data normalizing operation may occur in three different modes referred to herein as a test mode, a monitoring mode, and an adaptive mode. In the test mode, the normalizing operation provides a readout representing the normalized data value. In the monitoring mode, the operation provides a display representing the raw and normalized data values or furnishes these values to a computer for further processing or to a data bank for storage. In the adaptive mode, the normalizing operation provides error signals for regulating the control parameters to maintain these parameters at or within a given range about their standard values.

A disclosed application of the invention involves testing automotive steering pumps of the kind referred to earlier. In this application, the pump flow rate is the raw output data to be monitored and the hydraulic fluid temperature, pump back pressure, and pump rotor speed are the control parameters which affect the low rate. One unique advantage of the invention in the latter application is that it permits a pump test to be carried out with the existing test panel without the need for such precise regulation of fluid temperature, pump back pressure, and pump rotor speed as is required in the existing test procedure. This, in turn, relaxes the test stand operating parameters and requirements.

DESCRIPTION OF THE PREFERRED EMBODIMENTS

Figure 1:
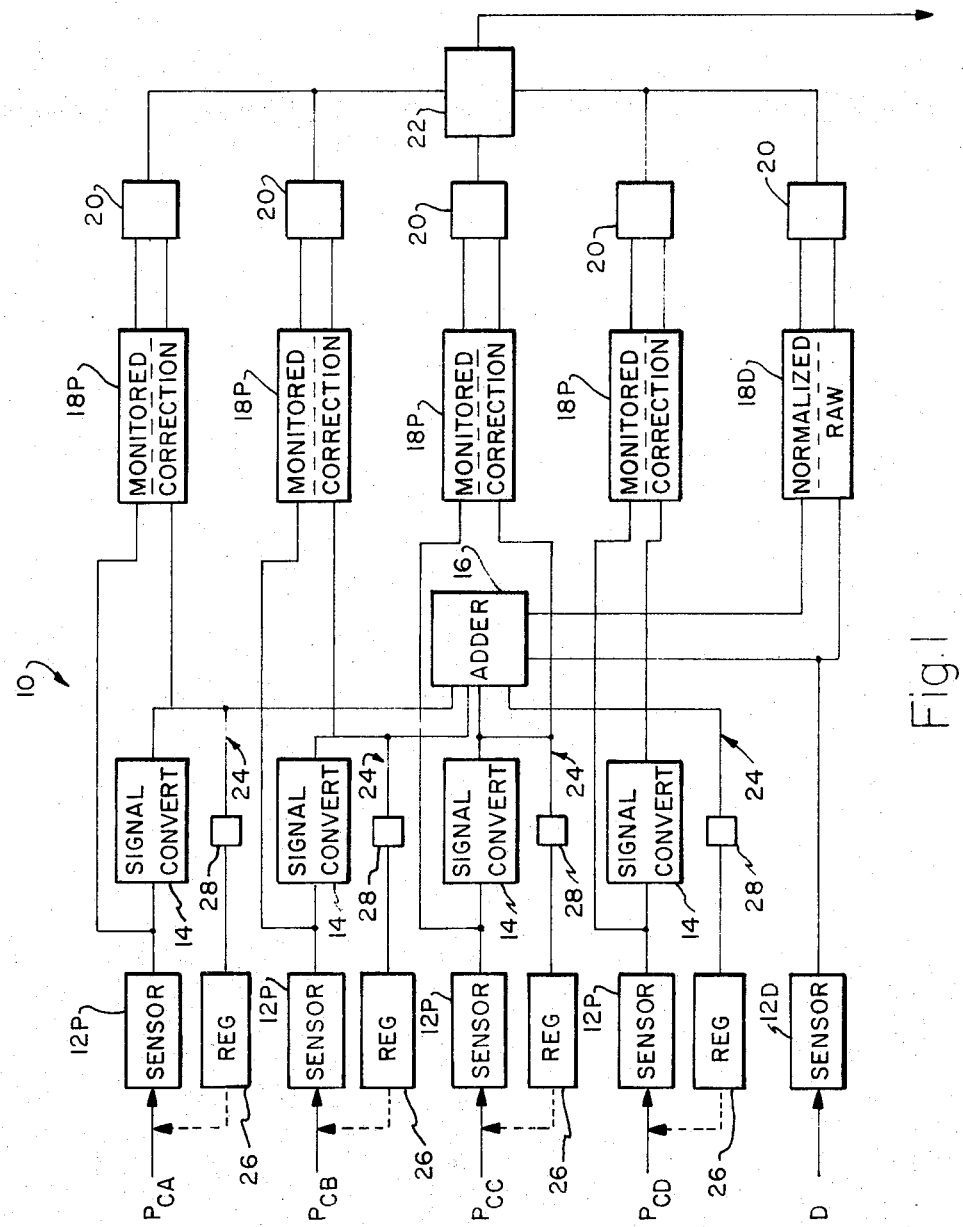
FIG. 1 is a block diagram illustrating the present data normalizing concept.

FIG. 1 diagrammatically illustrates a data normalizing system 10 according to the invention for monitoring raw numerical output data D representing the measured value of a selected function or parameter which varies according to a known relationship with each of a number of control functions or parameters $P_{CA}$, $P_{CB}$, $P_{CC}$, and $P_{CD}$ and normalizing the monitored value of the output data to determine its value, i.e., normalized value, under preselected standard conditions at which each control parameter has a predetermined standard or nominal value. As mentioned earlier, and will become readily apparent from the ensuing description, the present data normalizing system may be utilized to normalize raw output data from a variety of systems, machines, and the like. Accordingly, the input data to be normalized and its control parameters may represent a variety of quantities or functions. In the steering pump test application referred to earlier, for example, the output data represents the monitored or measured flow rate through the pump. The control parameters are hydraulic fluid temperature, pump back pressure, and pump rotor speed.

The data normalizing system 10 includes a means 12D for sensing or receiving and producing a raw data signal representing the value of the output data D, and a means 12P for sensing and producing a signal representing each control parameter $P_{CA}$, $P_{CB}$, $P_{CC}$, and $P_{CD}$. Connected to the output of each parameter sensing means 12P is a signal converter 14. Each signal converter converts its respective input parameter signal into a correction factor signal representing the change in the value of the raw output data corresponding to the deviation, if any, between the monitored and standard values of the respective control parameter. In this regard, it will be recalled that the output data to be monitored and normalized varies according to a known relationship with each control parameter. Each converter operates to convert its input parameter signal to a correction factor signal by effectively comparing the parameter value represented by the input signal with the standard parameter value, computing the change in the output data corresponding to this difference on the basis of the relationship between the output data and parameter, and producing a correction factor signal representing this change.

The raw output data signal from the data sensing means 12D and the correction factor signals of the signal converters 14 are fed to an adder 16. This adder algebraically sums these several signals and produces an output signal representing the value, i.e., normalized value, of the output data under standard conditions at which each control parameter $P_{CA}$, $P_{CB}$, $P_{CC}$, and $P_{CD}$ has its standard value. The output signal from the adder is referred to herein as a normalized data signal or simply a normalized signal.

The present data normalizing system may operate merely to provide the normalized data signal which then can be utilized to actuate a display, recorder or other readout means for providing a readout representing the normalized value of the output data. This operating mode of the system is referred to herein as its test mode. The particular data normalizing system 10 illustrated is operable in two other modes referred to as monitoring and adaptive modes. In the monitoring mode, the system provides readouts representing raw and normalized values of the output data is the monitored values of the control parameters, and the parameter correction factor values. Signals representing these various values may also be fed to computers for further processing or to a data bank for storage. In the adaptive mode, the system provides error or feedback signals for regulating the control parameters to maintain the latter at or within a given range about their standard values.

To this end, the illustrated data normalizing system has readout means 18P for displaying or recording the monitored values of the control parameters and their respective correction factor values, and readout means 18D for displaying or recording the raw and normalized valves of the output data. In this regard, it will be seen that each parameter readout means 18P has two inputs connected to the input and output, respectively, of the corresponding signal converter. The data readout means 18D has two inputs connected to the outputs of the raw data sensor 12D and the adder 16, respectively. Each readout means may have separate readout displays, as shown, actuated by its two inputs, i.e., the monitored parameter and correction factor inputs in the case of the parameter readout means 18P and the raw data and normalized data inputs in the case of the data readout means 18D. Alternatively, each readout means may have a single readout display and a switch for connecting the display to either input of the readout means.

From the description to this point of the data normalizing system 10, it is evident that each parameter readout means 18P receives an input signal representing the monitored value of the corresponding control parameter $P_{CA}$, $P_{CB}$, $P_{CC}$, and $P_{CD}$, as the case may be, and a signal representing the corresponding parameter correction factor. The data readout means 18D receives a raw data input signal representing the raw or monitored value of the output data D and a normalized data signal representing the normalized value of the output data. In the test mode, the normalized data value is obtained from the data readout means 18D. In the monitoring mode, the values of the control parameters and their correction factors and the raw and normalized data values are obtained from the corresponding readout means 18P, 18D.

The illustrated data normalizing system 10 also embodies interface units 20 which receive the same input signals as the readout means 18P, 18D, respectively, and feed converted signals to a common output computer 22. This computer may be programmed to operate on their input signals in any desired manner to provide any selected output information involving the input data D and its control parameters $P_{CA}$, $P_{CB}$, $P_{CC}$, and $P_{CD}$.

As noted earlier, the illustrated data normalizing system 10 is also operable in an adaptive mode in which the system regulates the control parameters $P_{CA}$, $P_{CB}$, $P_{CC}$, and $P_{CD}$ to maintain each at or within a given range about its standard or nominal value. To this end, the data normalizing system has feedback loops 24 extending between the outputs of the signal converters 14 and means 26 for regulating the control parameters $P_{CA}$, $P_{CB}$, $P_{CC}$, and $P_{CD}$, respectively. Each feedback loop feeds the correction factor signal from its respective signal converter to the corresponding parameter regulating means. Each regulating means regulates its respective control parameter in response to the correction factor signal in such a way as to maintain the control parameter at or within a given range about selected value, i.e., the standard or nominal parameter value. Thus, the correction factor signals provide, in effect, error or feedback signals for regulating the control parameters. Preferably, the feedback loops include switches 28 for inactivating the parameter regulating action when desired.

Figure 2:
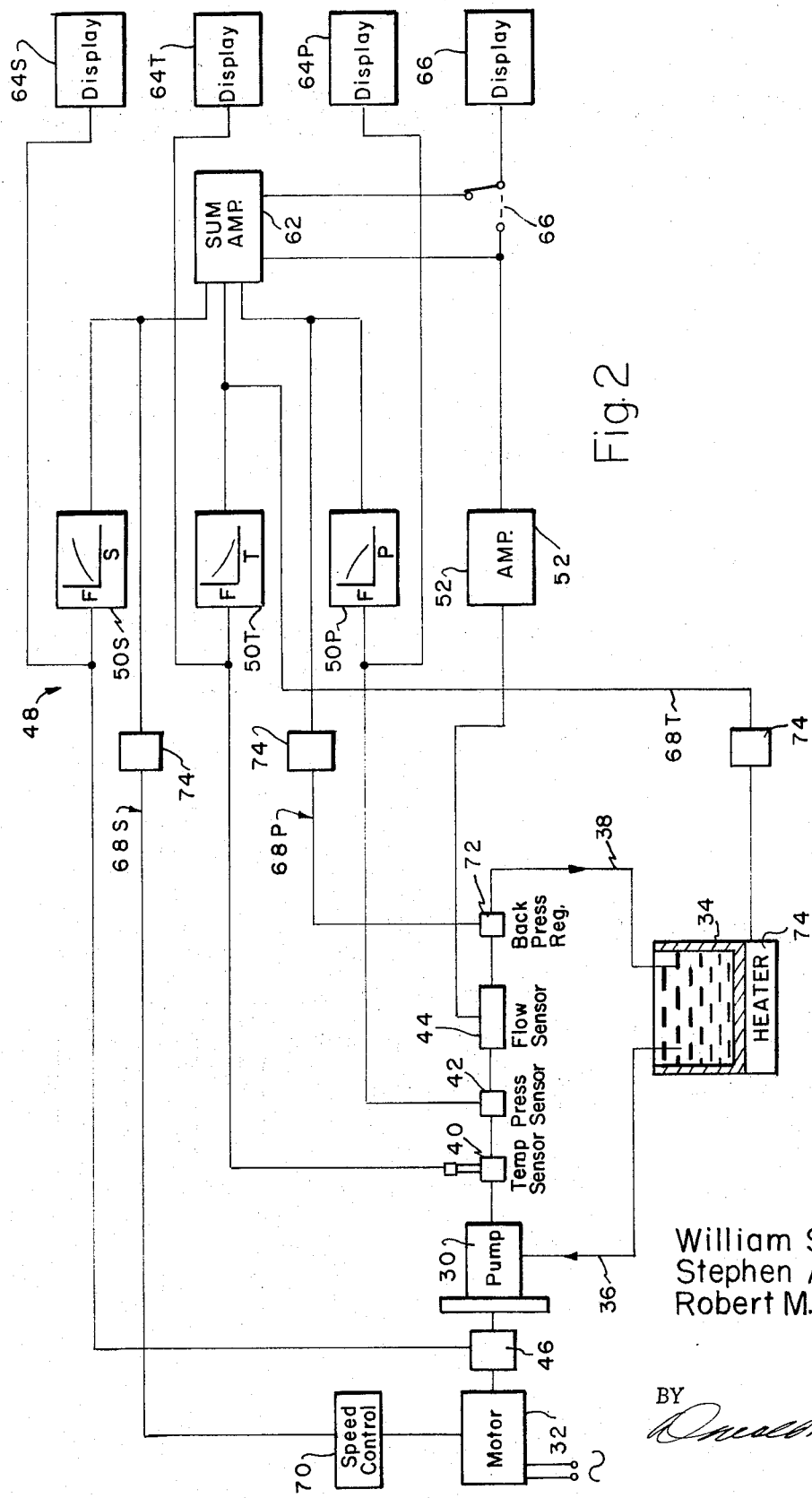
FIG. 2 illustrates application of the data normalizing concept to test rotary pumps, such as automotive hydraulic steering pumps.
Figure 3:
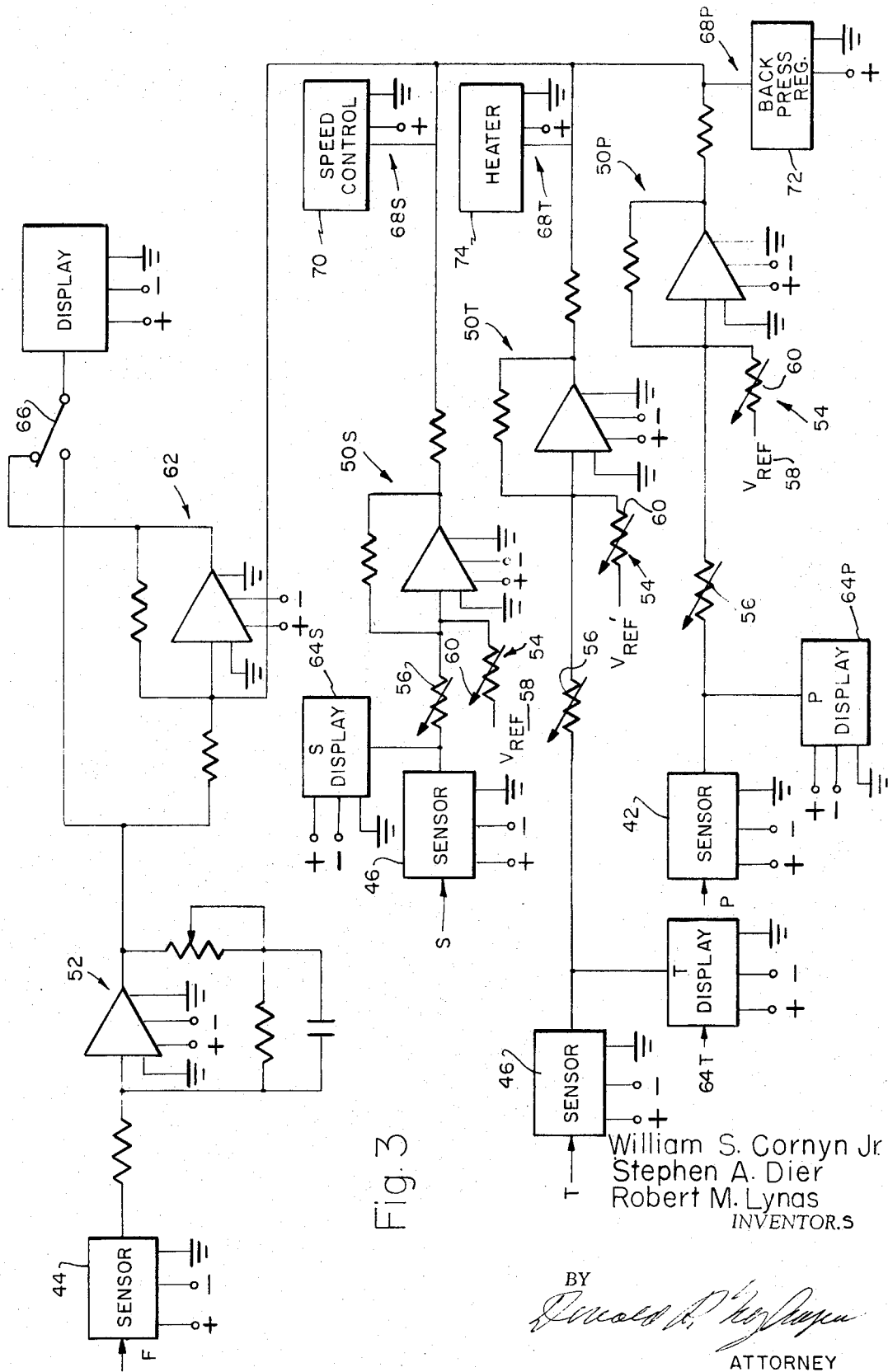
FIG. 3 is a circuit diagram of the data normalizing system in FIG. 2.

FIGS. 2 and 3 illustrate one practical application of the invention involving testing a rotary pump 30, such as an automotive steering pump, to determine its flow rate (F) under standard test conditions, i.e., at a predetermined hydraulic fluid temperature (T), pump rotor speed (S), and pump back pressure (P). In this regard, it will be recalled from the earlier discussion that the flow rate through a rotary pump varies according to a known relationship with each of the quantities or parameters fluid temperature, pump speed, and back pressure. In the context of the present disclosure, then, flow rate is the raw input data to be monitored and normalized and fluid temperature, pump speed, and back pressure are control parameters on which the input data is dependent.

Pump 30 is driven by a motor 32 and pumps hydraulic fluid from a reservoir 34 though a pump intake conduit 36 and returns the fluid to the reservoir through a pump discharge conduit 38. Arranged in the discharge conduit 38 as close as possible to the pump are a temperature sensor 40, a pressure sensor 42, and a flow rate sensor 44. Between the pump 30 and its motor 32 is a pump rotor speed sensor 46. Sensors 40, 42, 44, and 46 sense and produce d.c. signals representing, i.e., proportional to, respectively, the hydraulic fluid temperature (T) at the pump outlet, the back pressure (P) on the pump, the flow rate (F) through the pump, and the pump rotor speed (S). Any suitable type of sensors may be used. The rotor speed sensor 46 may comprise, for example, a toothed wheel on the pump rotor shaft, a transducer adjacent the wheel which generates an electrical impulse in response to rotation of each wheel tooth past the transducer, and means for converting the pulses from the transducer to a d.c. signal proportional to the pulse frequency.

The sensors 40, 42, 44, and 46 form part of a test data normalizing system 48 for normalizing the raw data or flow rate signal from the flow rate sensor 44. This normalizing system includes signal converters 50T, 50P, and 50S which are connected to and receive the temperature, pressure, and rotor speed signals from the temperature, pressure, and speed sensors 40, 42, and 46, respectively. Connected to the flow rate sensor 44 is an amplifier 52 for amplifying the flow rate signal from the sensor.

Figure 6:
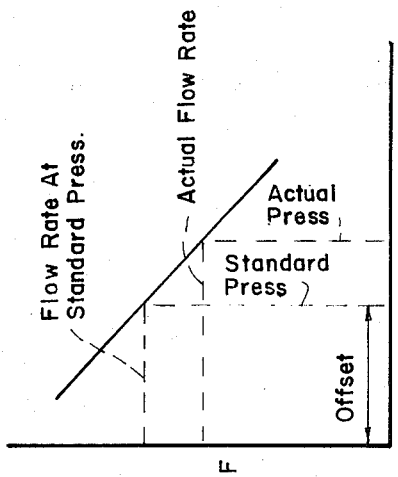
FIGS. 4, 5 and 6 are charts depicting the relationship between pump flow rate and pump rotor speed, hydraulic fluid temperature, and pump back pressure.
Figure 5:
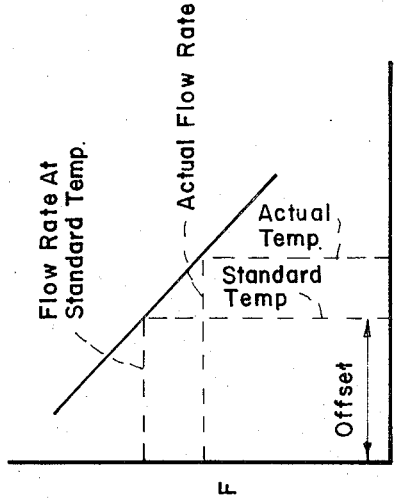
Figure 4:
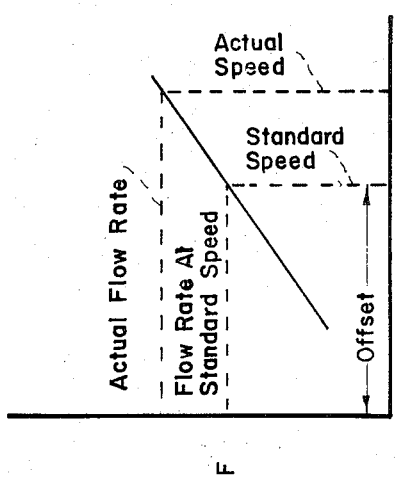

Each of the signal converters 50S, 50T, 50P converts its respective sensor input signal according to relationship between the corresponding control parameter, i.e., pump rotor speed, fluid temperature, or pump back pressure, as the case may be, and the output data, i.e., flow rate, into a d.c. correction factor signal representing, i.e., proportional to, the change in flow rate corresponding to the deviation, if any, between the monitored or sensed value and selected standard value of the respective control parameter. The relationships between the control parameters and flow rate are depicted by the small graphs within the signal converter boxes in FIG. 2 and on larger scale in FIGS. 4 through 6.

It will be immediately evident to those versed in the art that a variety of signal converters 50S, 50T, and 50P may be utilized in the data normalizing system 48 for converting the sensor signal inputs to the converters to corresponding correction factor signals. In the particular pump test application under discussion, flow rate varies approximately linearly with each of the control parameters, temperature, pressure, and speed over a substantial range of the parameters. In this case, if the control parameters remain within this range, the signal converters may be signal conditioning amplifiers with offset and scale adjustments 54 and 56, as shown in FIG. 3. Each offset adjustment includes a reference and voltage 58 of opposite sign to the d.c. signal from the respective control parameter sensor, and a variable resistor 60 for adjusting the reference voltage level at the amplifier input. The scale adjustment 56 of each amplifier is a variable resistor. The flow rate sensor amplifier 52 produces a d.c. output proportional to the flow rate through the pump 30.

The offset adjustment 54 of each signal converter or signal conditioning amplifier 50S, 50T, and 50P is set to a reference voltage level equal to the output signal voltage from the respective sensor 40, 42 or 46 when the corresponding control parameters, i.e., temperature, pressure or speed has its preselected standard value. The scale adjustment 56 of each signal conditioning amplifier is set to match the slope of the graph (FIGS. 4 through 6) of the corresponding control parameter, such that the output voltage of any one of the amplifiers in response to a given deviation of the corresponding control parameter equals the change in the output voltage of the flow rate amplifier 52 produced by such given deviation of the corresponding parameter.

It is now evident that when any of the control parameters has its standard or nominal value, the corresponding signal conditioning amplifier produces a null output. If any control parameter deviates from its standard or nominal value, the corresponding amplifier produces a d.c. output whose magnitude represents the change in flow rate corresponding to the deviation and whose sign represents the direction of the change, i.e., either an increase or decrease in flow rate.

As noted, the output signals from the signal converters or conditioning amplifiers 50S, 50T, and 50P are correction factor signals. The output signal of the flow rate amplifier 52 is a raw data or flow rate signal.

The correction factor signals from the amplifiers 50S, 50T, and 50P and the raw flow rate signal from the amplifier 52 are fed to an adder or summation amplifier 62. This summation amplifier sums the correction factor and raw flowrate signals to produce an output signal which is the normalized data signal referred to earlier and represents the normalized value of the pump flow rate. This is the pump flow rate under standard conditions at which the control parameters, fluid temperature, pump back pressure, and pump rotor speed have their standard or nominal values.

The normalizing system 48 includes readout means 64S, 64T, and 64P which are connected to the sensors 40, 42, and 46 to record or display the monitored fluid temperature, pump back pressure, and pump rotor speed. A readout means 66 may be connected, through a two position switch 66, to flow rate amplifier 52 or the output of the summation amplifier to display or record either monitored flow rate or normalized flow rate.

In some pump test applications, it may be desirable or necessary to regulate the control parameters in response to the correction factor signals from the signal converters or conditioning amplifiers 50S, 50T, and 50P to maintain the parameters in a given range about their standard or nominal values, such as a range in which they have a generally linear relationship with flow rate. To this end, the illustrated data normalizing system 48 has feedback circuits 68S, 68P, and 68T for regulating the pump rotor speed, pump back pressure, and hydraulic fluid temperature.

Feedback circuit 68S has a pump motor speed control 70 connected to the output of the pump speed signal converter 50S for controlling motor speed in response to the pump speed correction factor signal. Any suitable speed control may be used. An alternative method of controlling pump speed is to use a synchronous pump motor which is geared to drive the pump at the proper speed. The pressure feedback circuit 68P includes a back pressure regulator 72 in the pump discharge conduit 38 which is connected to the output of the pressure signal converter 50P to regulate the pump back pressure in response to the back pressure correction factor signal. The temperature feedback circuit 68T has a heater 74 connected to the output of the temperature signal converter 50T and disposed in heat transfer relation to the hydraulic fluid reservoir 34 for regulating the oil temperature in response to the temperature correction factor signal.

Preferably, the feedback circuits have switches 74 for inactivating the circuits when desired.

What is claimed as new in support of Letters Patent is:

1. A data normalizing system for normalizing raw numerical output data whose numerical value varies with each of at least two parameters according to a predetermined relationship to obtain normalized data representing the numerical value of the raw output data normalized to standard conditions at which each parameter has a given nominal numerical value, comprising:

means for receiving and producing a raw data signal representing the numerical value of said raw data;

means for sensing and producing a signal representing the numerical value of each parameter;

means for transforming each parameter signal according to the relationship between the respective parameter and said output data into a correction factor signal representing the change in numerical value of said output data corresponding to the deviation, if any, of the respective parameter from its nominal value; and means for combining said raw data and correction factor signals to produce a normalized data signal representing said normalized output data.

2. A data normalizing system according to claim 1 including:

readout means for displaying the numerical value of at least one of the following: raw output data, normalized output data, parameters, and correction factors.

3. A data normalizing system for normalizing raw numerical output data whose numerical value varies with at least one parameter according to a predetermined relationship to obtain normalized data representing the numerical value of the raw output data normalized to standard conditions at which each parameter has a given nominal numerical value, comprising:

means for receiving and producing a raw data signal representing the numerical value of said raw data;

means for sensing and producing a signal representing the numerical value of each parameter;

means for transforming each parameter signal according to the relationship between the respective parameter and said output data into a correction factor signal representing the change in numerical value of said output data corresponding to the deviation, if any, of the respective parameter from its nominal value;

means for combining said raw data and correction factor signals to produce a normalized data signal representing said normalized output data; and means for regulating at least one parameter in response to the corresponding correction factor signal to maintain the regulated parameter within a given range about its nominal value.

4. A data normalizing system according to claim 3 wherein:

said last mentioned means comprises means for regulating each parameter in response to the corresponding correction factor signal to maintain the regulated parameter within a given range about its nominal value.

5. A data normalizing system according to claim 3 including:

readout means for displaying the numerical value of at least one of the following: raw output data, normalized output data, parameters, and correction factors.

6. A data normalizing system for normalizing raw output data representing the actual numerical value of a given operating function of a machine which varies with each of at least two operating parameters of the machine according to a predetermined relationship to obtain normalized data representing the numerical value of the raw data normalized to standard operating conditions at which each parameter has a given nominal value, comprising:

means for operating said machine;

means for sensing and producing a signal representing the actual numerical value of said operating function;

means for sensing and producing a signal representing the numerical value of each operating parameter;

means for transforming each parameter signal in accordance with the relationship between the respective parameter and said function to a correction factor signal representing the change in numerical value of said function corresponding to the deviation, if any, of the respective parameter from its nominal value; and means for combining said function and correction factor signals to produce a normalized function signal representing said normalized data.

7. A data normalizing system according to claim 6 including:

readout means for displaying at least one of the following: actual function value, normalized data value, parameter value, and correction factor value.

8. A data normalizing system for normalizing raw output data representing the actual numerical value of a given operating function of a machine which varies with at least one operating parameter of the machine according to a predetermined relationship to obtain normalized data representing the numerical value of the raw data normalized to standard operating conditions at which each parameter has a given nominal value, comprising:

means for operating said machine;

means for sensing and producing a signal representing the actual numerical value of said operating function;

means for sensing and producing a signal representing the numerical value of each operating parameter;

means for transforming each parameter signal in accordance with the realtionship between the respective parameter and said function to a correction factor signal representing the change in numerical value of said function corresonding to the deviation, if any, of the respective parameter from its nominal value;

means for combining said function and correction factor signals to produce a normalized function signal representing said normalized data; and means for regulating at least one operating parameter in response to the corresponding correction factor signal to maintain the respective parameter value within a given range about its nominal value.

9. A data normalizing system according to claim 8 wherein:

means for regulating each operating parameter in response to the corresponding correction factor signal to maintain the respective parameter value within a given range about its nominal value.

10. A data normalizing sytem according to claim 8 including:

readout means for displaying at least one of the following: actual function value, normalized data value, parameter value, and correction factor value.

11. A data normalizing system according to claim 6 wherein:

said machine is a pressure fluid device such as a hydraulic pump;

said operating function is fluid flow rate through the device; and said operating parameters are fluid temperature and pressure and operating speed.

12. A data normalizing system according to claim 6 wherein:

said machine is a rotary hydraulic pump;

said machine operating means comprises a source of hydraulic fluid to be connected to the pump intake and a motor for driving the pump rotor;

said machine operating function is fluid flow rate through the pump; and said machine operating parameters are fluid temperature and pressure and rotor speed.

13. The method of normalizing raw numerical output data whose numerical value varies according to a predetermined relationship with each of at least two parameters to obtain normalized data representing the numerical value of the output data normalized to standard conditions at which each parameter has a given nominal value, comprising the steps of:

producing a raw data signal representing the numerical value of said raw output data;

producing a parameter signal representing the numerical value of each parameter;

transforming each parameter signal according to the relationship between the respective parameter and said output data into a correction factor signal representing the change in numerical value of said output data corresponding to the deviation, if any, of the respective parameter from its nominal value; and combining said raw data and correction factor signals to provide a normalized data signal representing said normalized output data.

14. The method of normalizing raw numerical output data whose numerical value varies according to a predetermined relationship with at least one parameter to obtain normalized data representing the numerical value of the output data normalized to standard conditions at which each parameter has a given nominal value, comprising the steps of: producing a raw data signal representing the numerical value of said raw output data;

producing a parameter signal representing the numerical value of each parameter;

transforming each parameter signal according to the relationship between the respective parameter and said output data into a correction factor signal representing the change in numerical value of said output data corresponding to the deviation, if any, of the respective parameter from its nominal value;

combining said raw data and correction factor signals to provide a normalized data signal representing said normalized output data; and regulating at least one parameter in response to the corresponding correction factor signal to maintain the respective parameter within a given range about its nominal value.

15. The method of claim 14 wherein:

said regulating step comprises regulating each parameter in response to the corresponding correction factor signal to maintain the respective parameter within a given range about its nominal value.

16. The method of claim 13 including the additional step of:

displaying the numerical value of at least one of the following: raw output data, normalized data, parameters, and correction factors.

17. The method of claim 14 including the additional steps of:

displaying the numerical value of at least one of the following: raw output data, normalized data, parameters, and correction factors.

18. The method of normalizing raw output data representing the actual numerical value of a given operating function of a machine which varies with at least one operating parameter of the machine according to a predetermined relationship to obtain normalized data representing the numerical value of the raw data normalized to standard operating conditions at which each parameter has a given nominal value, comprising the steps of:

operating said machine;

sensing and producing a signal representing the actual numerical value of said operating function;

sensing and producing a signal representing the numerical value of each operating parameter;

transforming each parameter signal in accordance with the relationship between the respective parameter and said function to a correction factor signal representing the change in numerical value of said function corresponding to the deviation, if any, of the respective parameter from its nominal value; and combining said function and correction factor signals to produce a normalized function signal representing said normalized data.

* * * * *